US00RE38064E

(19) United States
(12) Reissued Patent
Morello

(10) Patent Number: US RE38,064 E
(45) Date of Reissued Patent: Apr. 8, 2003

(54) MACHINE AND METHOD FOR FORMING ARCHED ROOF VERTICAL WALL SELF SUPPORTING METAL BUILDINGS

(75) Inventor: Frederick Morello, Johnston, PA (US)

(73) Assignee: MIC Industries, Reston, VA (US)

(21) Appl. No.: 09/215,021

(22) Filed: Dec. 17, 1998

Related U.S. Patent Documents

Reissue of:
(64) Patent No.: 5,249,445
Issued: Oct. 5, 1993
Appl. No.: 07/872,005
Filed: Apr. 22, 1992

(51) Int. Cl.[7] ..... B21D 13/04; B21D 53/00
(52) U.S. Cl. ..... 72/8.3; 72/129; 72/168; 72/177
(58) Field of Search ..... 72/7.1, 129, 9.1, 72/177, 178, 173–175, 168, 139, 12, 307, 8.3

(56) References Cited

U.S. PATENT DOCUMENTS

| | | | | |
|---|---|---|---|---|
| 3,150,707 A | 9/1964 | Howell | | |
| 3,670,553 A | 6/1972 | Nothum | 72/307 | |
| 3,831,421 A | 8/1974 | Koger | 72/307 | |
| 3,875,642 A | 4/1975 | Knudson | 29/243.5 | |
| 3,902,288 A | 9/1975 | Knudson | 52/86 | |
| 3,955,389 A | 5/1976 | Foster | 72/9 | |
| 3,967,430 A | 7/1976 | Knudson | 29/243.5 | |
| 4,039,063 A | 8/1977 | Knudson | 72/169 | |
| 4,080,815 A | 3/1978 | Foster | 72/168 | |
| 4,205,544 A | 6/1980 | Foster | 72/307 | |
| 4,364,253 A | 12/1982 | Knudson | 72/187 | |
| 4,470,186 A | 9/1984 | Knudson | 29/243.5 | |
| 4,505,084 A | 3/1985 | Knudson | 52/528 | |
| 4,505,143 A | 3/1985 | Knudson | 72/187 | |

FOREIGN PATENT DOCUMENTS

GB 2008999 6/1979

*Primary Examiner*—Daniel C. Crane
(74) *Attorney, Agent, or Firm*—Russell Paige; Jones, Day, Reavis & Pogue; Blaney Harper

(57) ABSTRACT

A mobile metal building forming machine forms panels of predetermined length from a coil of flat metal and then the formed panels are continuously crimped on their side edges for strength and are selectively curved by crimping the bottom of the panel. The crimping and curvature are automatically controlled so that building panels with vertical walls and an arched roof may be formed. A moveable crimping roll is automatically portioned to control the curvature and the roll is chain driven so that it may be moved without affecting its rotational drive.

28 Claims, 12 Drawing Sheets

MACHINE AND METHOD FOR FORMING ARCHED ROOF VERTICAL WALL SELF SUPPORTING METAL BUILDINGS

Matter enclosed in heavy brackets [ ] appears in the original patent but forms no part of this reissue specification; matter printed in italics indicates the additions made by reissue.

BACKGROUND OF INVENTION

1. Field of the Invention

This invention relates to improvements in machines and methods for constructing metal building and building configurations, and more particularly relates to arched roof, vertical wall, self supporting metal buildings formed of adjacent seamed together panels and a method and machine for forming such panels.

2. Background and Prior Art

It is known in the prior art to make metal buildings from adjacent formed metal building panels which are arched or curved, assembled side by side and seamed together. See for example, Knudson U.S. Pat. No. 3,902,288 (1975) for showing of such building in which the roof panels are completely curved or arched and extend to the foundation. In such buildings the roof panels continue as the side walls of the building and the basic building construction is in the shape of a continuous arch or semi-circle when viewed from the end. A machine for making the metal panels for such building in which the formed panels are corrugated not only on the side edges of the box, but also on the bottom to create the curvature is shown in Knudson U.S. Pat. No. 3,842,647 (1974). A method of building the building by adjacent panels which are seamed together is disclosed in Knudson U.S. Pat. No. 3,967,430 (1976). A seamer for forming the seams between the adjacent panels of the prior Knudson patents is shown in Knudson U.S. Pat. No. 3,875,642 (1975). The prior art represented by the Knudson patents is owned and has been commercialized by MIC Industries, Inc. of Reston, Va. in its mobile K-Span® machines.

An arched building construction i.e., construction of which walls and roof are completely arched has advantages, but also, a number of limitations. One limitation is the absence of vertical walls which limits the use of vertical space. Often users of metal buildings want vertical walls both for aesthetic purposes and to allow more use of space near the edges of the building. Additionally, known prior art machines had a limitation on the thickness of steel used in forming the metal panels, because of machine limitations. The basic size and strength of such metal buildings is also limited by local wind and live load limitations as established by building codes throughout the nation and the world. As these building code standards become more conservative, a builder is effectively limited to only certain size buildings. The complete arched building must be limited in size in order to prevent overloading such as could occur from extensive wind loads produced by hurricanes. However, when the total roof height is reduced to approximately one-fifth of the total building width, hurricane force winds to not affect the building as much, because of reduced frontal area. Thus, there is a need in the art for a metal building formed of continuous panels which is not completely arched but has straight vertical walls while utilizing the economy of the seamed panel construction of the prior art. Such vertical wall buildings would satisfy a need in the art for space, economy, usefulness and strength.

In addition to the prior art discussed above, Knudson U.S. Pat. No. 4,039,063 (1977) discloses a run out apparatus and method for handling formed panels to produce arched metal buildings. As shown in the patent run out tables can be positioned to collect the curved panels. Additional patents exist in the art for forming and assembing relatively wide panels for arched metal buildings, see Knudson U.S. Pat. No. 4,364,253 (1982) U.S. Pat. No. 4,505,143 (1985), U.S. Pat. No. 4,505,084 (1985) and the seamer therefor in Knudson U.S. Pat. No. 4,470,146 (1984). These patents are owned by and commercialized in M.I.C.'s Super Span® mobile metal forming machines. In the prior art the radius of the arch could only be adjusted by manual means. Furthermore, the radius of the arch could only be adjusted to a desired curvature when there was no material in the machine. The procedure for radius adjustment included setting dials to a reference number to form a predetermined length of metal then forming the metal and comparing it to a radius gauge that must be made from a plywood template or a similar radius measuring device. If after inserting a piece of metal in the machine and curving it, the radius is incorrect, the operator must dial a new set of numbers and rely on experience and rules of thumb to help him achieve the proper radius. In order to achieve the proper curvature for arched panels, up to 500 pounds or more of metal may be wasted by bending them to the wrong curvature, depending on how skilled the machine operator is. Thus, there is need in the art to provide for automatically and controllably adjusting the radius of curvature and to be able to accomplish that with material in the machine, so that no material is wasted reaching the desired curvature.

Another drawback in the prior art is that the dials set to control the radius of the panel independently operate on the top side of the panel or the bottom side. Failure to adjust the two dials properly will cause the curved panel to distort and produces panels which are unacceptable for building use and must be scrapped. Distortion is sometimes termed "corkscrewing." Thus, there is need in the art to allow automatic and continuous adjustment of the curvature of the panels by a semi-skilled operator.

Another deficiency in the prior art arched panel forming machines is that they do not produce straight sections and curved sections together on the same panel. Furthermore, straight panels formed separately and used as vertical wall building panels are weak because they are not crimped. In other words with the existing technology, crimping just the sidewalls of the panels cannot be accomplished. But there is a need in the art to provide for a crimping of the side walls of straight panels used as vertical building walls.

Furthermore, the prior known machines for producing arched metal building panels have main crimping rollers which when being adjusted separate from each other causing diminished contact area of the gears resulting in significant premature gear wear. Also, when the crimping rolls of the prior art become separated, it is very difficult to re-engage the gears without physically guiding them into position which requires the machine operator to adjust the machine with moving machine parts, which is unsafe. Furthermore, when the main rolls are separated and the gear teeth are so far out of mesh, the gear backlash is severe, causing the main crimpers to turn out of time with each other and results in unacceptable finished panels. There is a need in the art for an improved drive train of the main crimping rolls which eliminates the above mentioned problems and allows for an extremely smooth trouble-free automatic crimping operation.

In the prior art, the operation of the machine was manual and the hydraulic system was adequate, however, it is desirable to allow simultaneous use of components and automatic and continuous adjustment of the crimping operation while allowing the hydraulic control of the panel former, shear blade and other controls. Thus there is a need in the art for automatic controls from a control panel so that a semi-skilled operator can automatically control the forming machine to produce panels of any desired curvature including portions of which that are straight and not curved.

There is also need in the art for an improved building method for joining multiple buildings together and providing column support for the side walls without significant conditional components.

SUMMARY OF THE INVENTION

This invention provides a machine for forming panels to make buildings in which a portion of the panels are curved and the curvature is automatically controlled. The machine also makes panels which are strengthened by crimping and which panels may have a straight as well as a curved portion so that the panels can be used to construct a building with an arched roof and vertical walls. Automatic control of the machine is through hydraulics and a microprocessor controlled by measuring and monitoring of the panels formed. The curvature of an arched portion of the panel is controlled by the extent of crimping of the bottom of the panel and extent of crimping is determined by the automatically controlled spacing of main crimping rolls. Moreover, the controls are operable during forming of the panels and with the panels in the crimping rolls. Automatic positioning of the crimping rolls is accomplished without premature wear on the roll drive gears or undue backlash, i.e., it is accomplished with an extremely smooth, trouble-free drive train. The hydraulics of the system together with the electrical control features allow the machine to be operated by a semi-skilled worker without a great deal of experience.

The invention also includes a building method and a building construction in which multiple buildings are joined together without additional columnar support, i.e., using the side walls as columns. This is accomplished by assembling two vertical panels back to back to provide a stiff column with an extruded fastening member reinforcing bars and concrete within the space between the vertical panels.

DETAILED DESCRIPTION OF THE PREFERRED EMBODIMENTS

Figure 1:
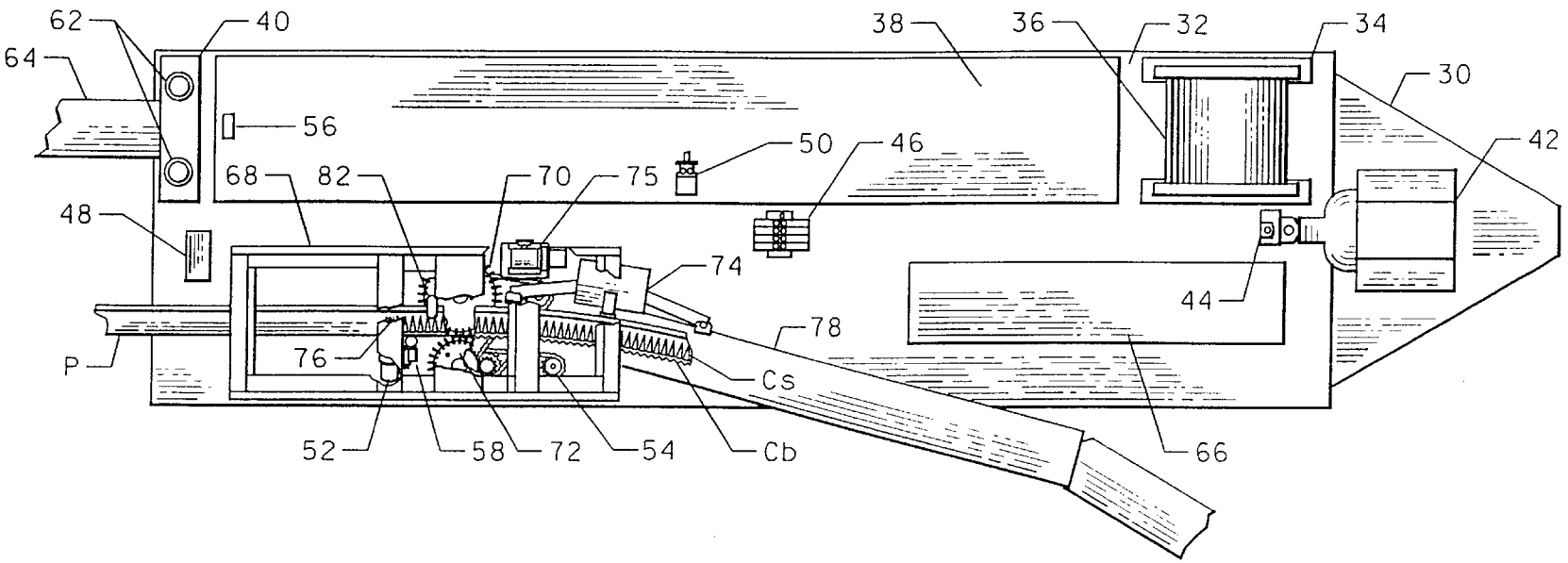
FIG. 1 is a top plan view of the machine of this invention illustrating the general arrangement of the component parts and with some portions broken away and other positions shown only schematically for clarity.

FIG. 1 shows the general arrangement of the machine of this invention which is preferably mounted on a trailer 30 so as to be mobile and moveable to an on site location for forming the metal panels which will be used in erecting the buildings. The components of the machine are assembled on a deck 32 of the trailer and include a roll holder 34, for holding a roll 36 of sheet metal of appropriate gauge from which the building panels are formed. Along one side of the machine adjacent to the supply roll of metal there is a roll forming machine 38 which includes a plurality of metal forming rolls for forming the sheet metal into a desired configuration. Since this roll forming machine is known in the art mentioned above it need not be shown or described. The cross sectional shape of the metal leaving the forming rolls may be that known in the art and as shown in the prior patents identified above, wherein there are different shaped panels which are assembled side by side with the edges crimped together by a seamer, also as known in the art. At the end of the roll forming station there is a hydraulically operated shear 40 for shearing the desired and measured length of the formed panel.

An internal combustion engine 42 (preferably a diesel engine) is mounted on the trailer for supplying hydraulic power via a hydraulic pump 44. A main hydraulic valve 46 is mounted on the trailer for controllably feeding hydraulic fluid for various hydraulic actuators. An operator control panel 48 includes various controls, readout panel and a microprocessor.

Panel forming rolls of the panel roll forming section 38 are powered by a hydraulic motor 50. Other hydraulic motors 52 are provided for crimping the side of the formed panel P and forming the crimp $C_s$ as is known in the prior art. Another hydraulic motor 54 is provided for driving the panel bottom crimping rolls to provide a bottom crimp which determines the curvature of the panel, the bottom crimp being shown as $C_b$.

A panel length measuring device 56 is provided for measuring the length of the formed panels electronically from the roll forming machine. Another substantially identical panel length measuring device 58 is positioned on the other side of the machine for measuring the length of the formed panel being fed to a crimping and curving section 68.

The hydraulic shear 40 is operated by hydraulic cylinders 62. Run out support tables 64 are positioned adjacent to the shear and in line with the roll forming section 38 to support the formed panel. The trailer will have appropriate racks 66 for storing the support tables 64 and 78 and other essentials equipment while the trailer is being transported.

On the side of the trailer opposite the roll forming section 38 is the crimping and panel curving section 68. The bottom crimping to produce the crimp $C_b$ is accomplished by a pair of crimping rolls 70 and 72. A curvature measuring device 74 contacts the panel following the bottom crimping rolls to determine the radius or degree of curvature that the bottom crimping is causing the panel to assume. Because the bottom crimping controls the degree of curvature and the degree of bottom crimping is controlled by the distance between the axis of the crimping rolls 70 and 72, movement of one crimping roll relative to the other determines the degree of curvature. Hydraulic motor 75 is provided to move crimping roll 70 relative to roll 72 to control the degree of curvature. The side crimping for the side of the panel is provided by side crimping rolls 76 driven by motors 52. Run out tables 78 are provided for receiving the formed panel.

The crimping rolls 70 and 72 can be completely disengaged from the bottom of the panel P in which case the panel will not have curvature (i.e., crimp $C_b$ will be absent) and the panel will be straight, but will be straightened by the side crimps $C_s$. By automatically controlling the engagement and position of the crimping rolls the formed panel may have a straight section or sections and a curved section or sections with the degree of curvature or the radius of the curved section being accurately and automatically controlled. When it is desirable to have a building with vertical side walls the panels formed by the machine of this invention can be set to provide formed panels with straight sections either with an arched roof or straight (sloping) roof with a radius or curved section between the walls and at the apex of the roof. All methods for controlling this machine and the formed shapes described are all programmably controlled. The panels formed by the machine of this invention may be seamed together by seamers as taught in the prior art.

Figure 2:
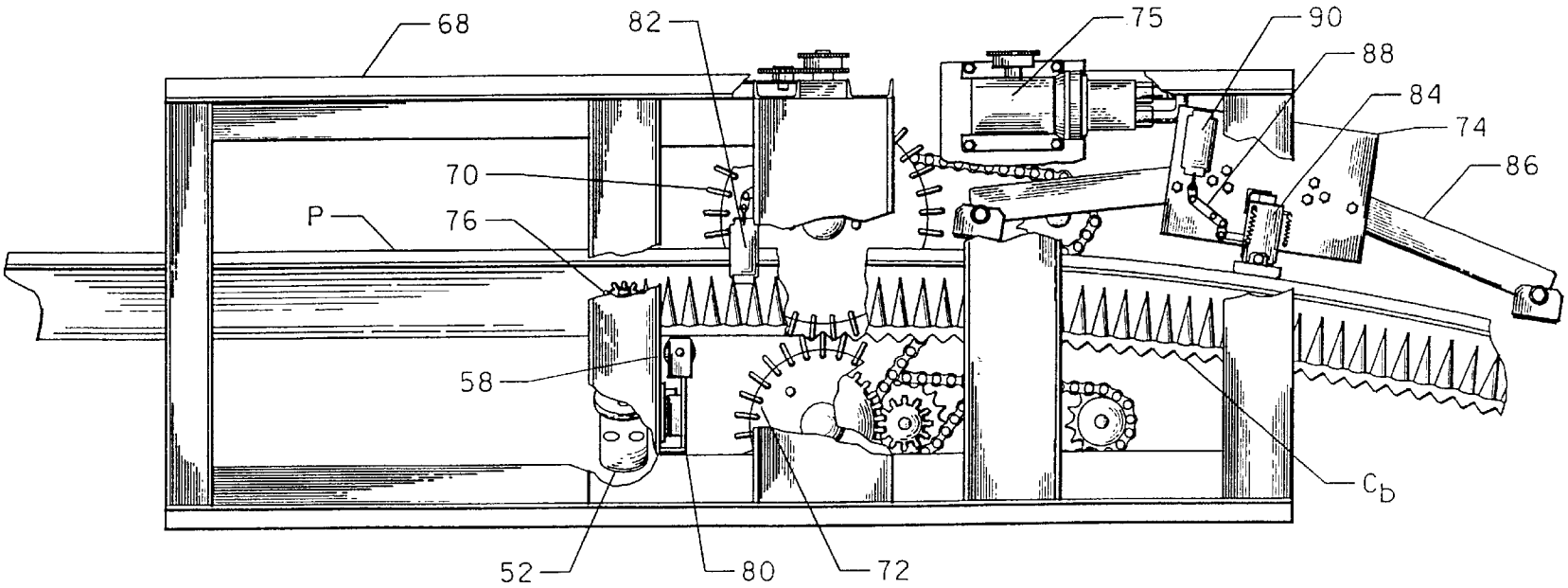
FIG. 2 is a partial top plan view of the machine of this invention with portions broken away for illustrating the main crimping rolls and the controls thereof.

As shown in FIG. 2 an electronic encoder 80 is associated with panel length measuring device 58 and is used for measuring the length of panel which is run through the side crimping rolls. Another electronic encoder 82 is used for determining the position of the crimping rolls relative to each other, i.e., the depth of crimp if any. The curvature measuring assembly 74, also detailed in FIG. 9 includes measuring assembly 84 which, when contacting the curved panel, will measure the curvature, This is achieved by when the fixed arms 86 contact the panel within a fixed distance, the vertical or height dimension of the arc length will be determined by assembly 84. The mechanical linkage 88 will position the electronic encoder 90. This encoder will send the electronic information back to the microprocessor for further controlling the machine.

Figure 3:
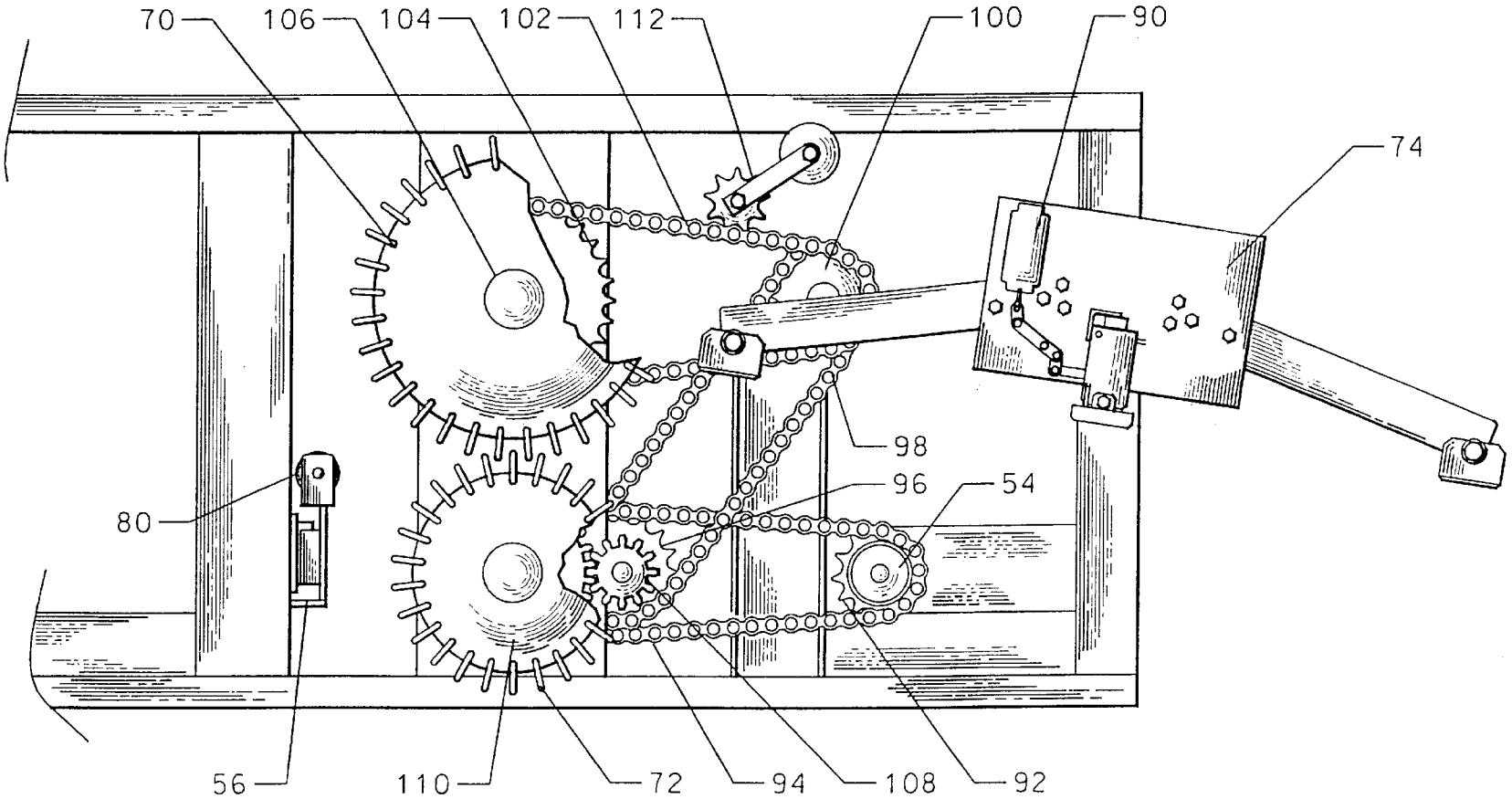
FIG. 3 is a view somewhat similar to FIG. 2 but with different elements removed for showing the drive train for the main crimping rolls.

The rotational drive of the crimping rolls is shown in FIG. 3. The crimping roll hydraulic motor 54 drives the shaft to which sprocket 92 is fixed and sprocket 92 drives chain 94 trained over sprocket 96. There are two sprockets 96 spaced side by side on the shaft and chain 98 is trained over one of them and sprocket 100. Another sprocket 100 on the same shaft carries drive chain 102 trained around sprocket 104 fixed to drive shaft 106 of crimping roll 70. A pinion 108 is fixed to the shaft of sprocket 96 and a drive gear 110 is fixed to the drive shaft of crimping roll 72 for the drive of that roll. A tension assembly 112 is provided for tensioning chain 102 which is variably positioned due to the position adjustment of roll 70 under the control of motor 75.

In the prior machines of this type crimping rolls were driven by three spur gears directly coupled. When the main crimping roller moved away from the gears the contact ratio was small and the gears suffered premature wear and failure. With the present construction the main crimping rolls 70 and 72 are mechanically coupled but complete freedom of movement is allowed without affecting the timing and without gear backlash.

Figures 4, 5:
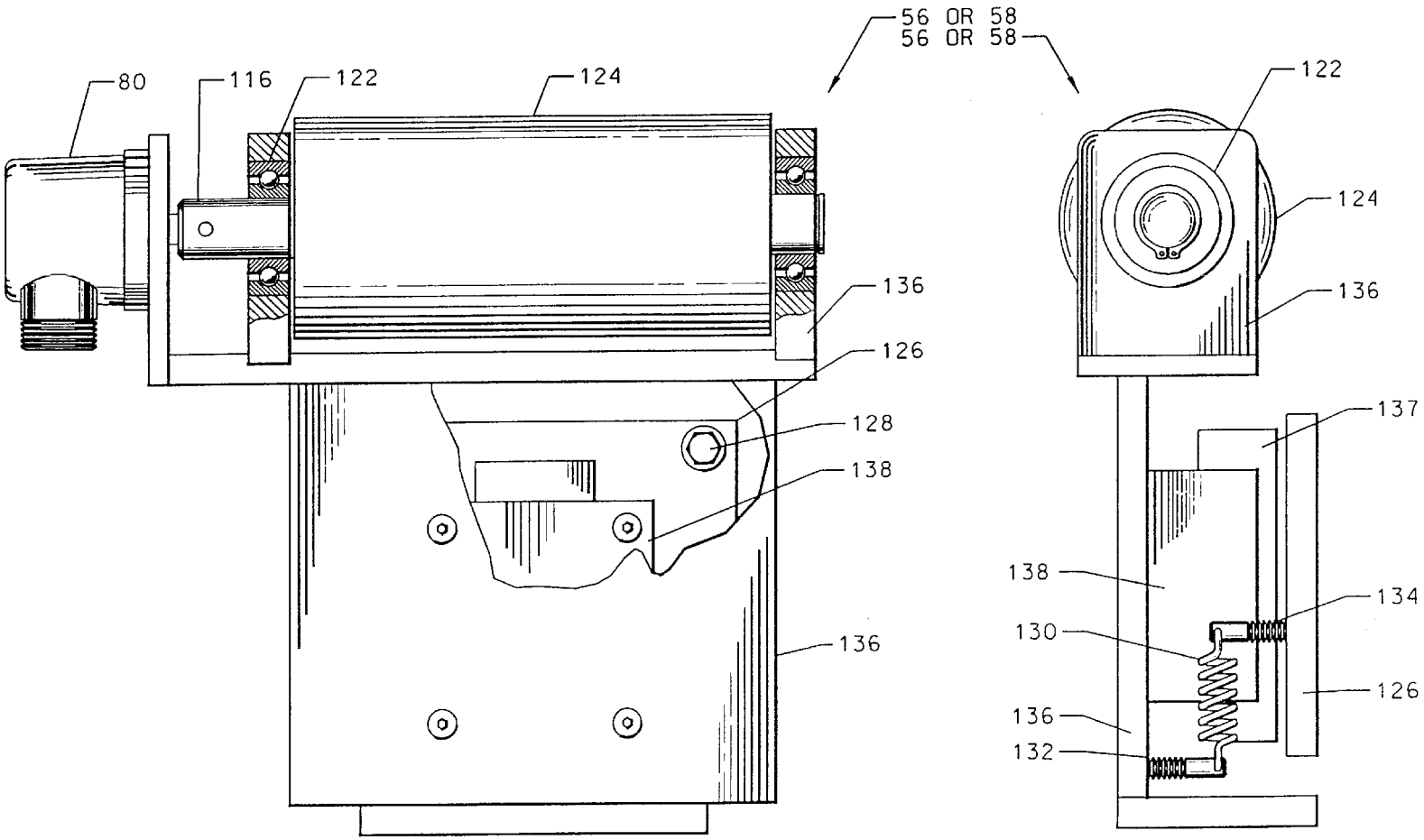
FIG. 4 is a front elevation view showing the positioning of a measuring device for measuring the amount of panel which has passed a predetermined point.
FIG. 5 is an end elevation view of the assembly shown in FIG. 4.

FIGS. 4 and 5 show the measuring device assembly such as 56 and 58 for electronically measuring the length of formed panels. The encoder 80 is connected through a water tight plug and harness 114 to the microprocessor. The measuring roller of cylindrical shape 124 rolls freely via bearings 122. This roller is machined from phenolic material which is very wear resistant and provides adequate friction needed for accurately measuring the panels. The support and mounting for the assembly includes a mounting plate 126 secured to the frame of the machine by bolts 128. The measuring device is movably mounted and biased by extension spring 130 attached to spring tab 132 on mounting plate 126 and tab 134 on a moveable frame 136 of the measuring roll. Moveable block 138 slides on a rail 137 so that the frame 136 carrying the roll 124 can move up and down always being pressed against the underside of the panel P by the bias from spring 130.

Figures 6, 7:
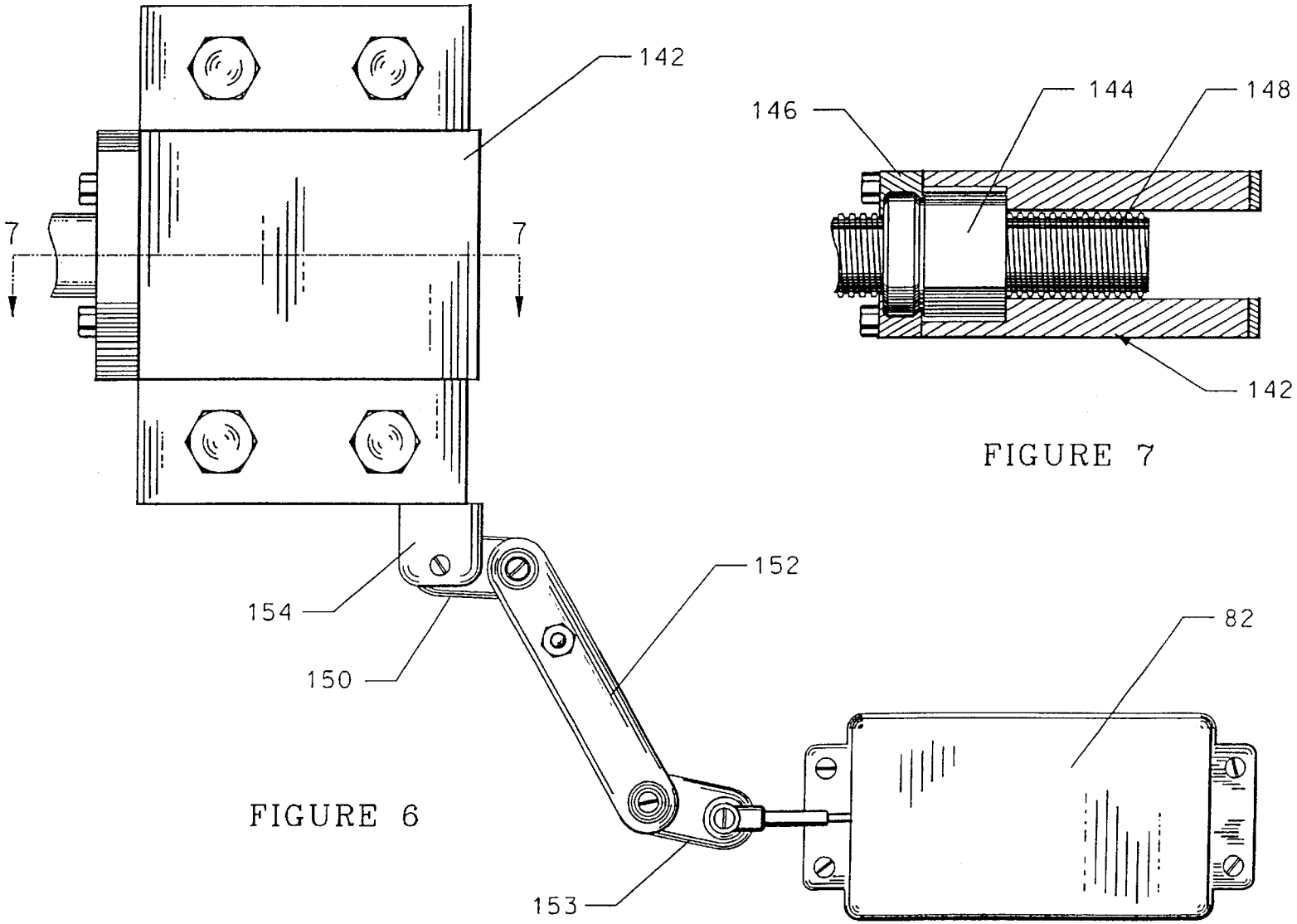
FIG. 6 is a top plan view with a portion broken away of an assembly of the device for moving the crimping rolls and accurately measuring its position.
FIG. 7 is a sectional view taken along lines 7—7 of FIG. 6.

For moving the crimping roll 70 it is mounted to a plate and moveable thrust block 142, see FIGS. 6 and 7. A bronze nut 144 and retaining flange 146 is assembled to an Acme threaded rod 148, which is rotated by motor 75. This threaded rod rides within the nut 144 and allows the thrust block to move radially of the rollers giving the crimper its desired movement ranges. The use of the nut allows very slow rotation for example 1 to 2 rpms and very high speed returns around 40 to 50 rpm. As the thrust block 142 is moved radially it in turn moves mechanical links 150, 120 and 153 which are connected to the thrust block by clevis 154 and also connected to the encoder 82 to determine the position of the crimping rolls.

Figure 8:
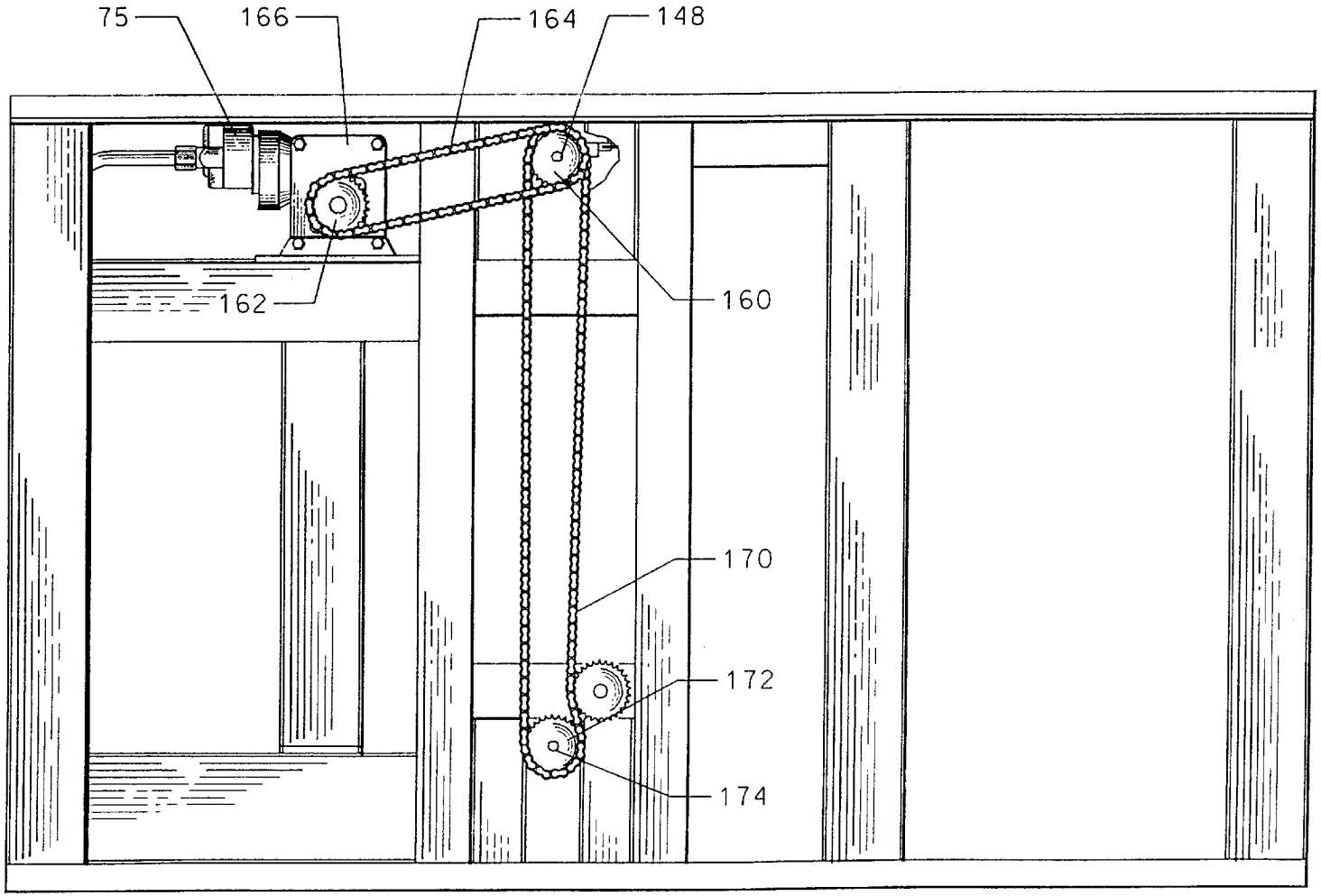
FIG. 8 is a side elevation view illustrating the drive for moving the main crimping rolls with portions broken away for the aid of clarity.

FIG. 8 shows the drive for both ends of the shaft of lower crimping roll 70 which are moved together to the same position. Sprocket 160 is attached to shaft 148 and is driven by chain 164 trained around sprocket 162 which in turn is connected to a gear reduction unit 166 driven by hydraulic motor 75. Another sprocket chain 170 is trained around another sprocket 160 and a further sprocket 172 on shaft 174. Shaft 174 is similar to shaft 148 and controls the other end of roll 70. Both of these shafts are the ends of the threaded rods 148. With the proper position of the crimping rolls the accuracy of the finished panels can be accomplished to eliminate the waste typically obtained as a result of using the prior art machines.

Figure 9:
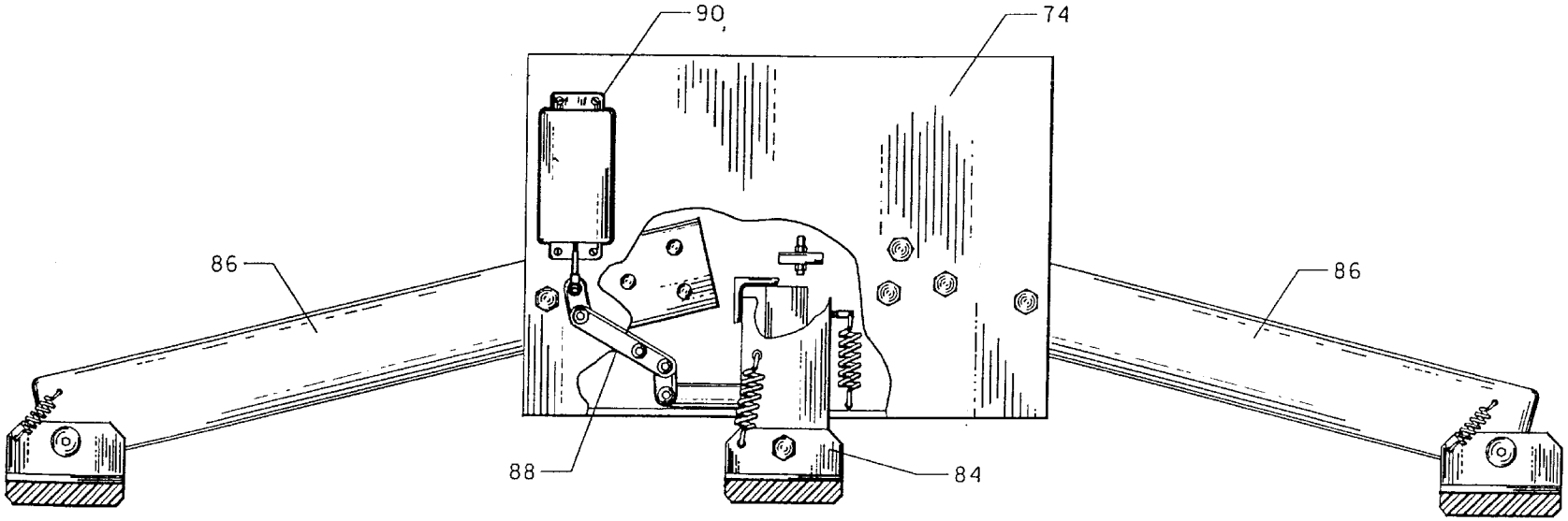
FIG. 9 is a top plan view of the radius measuring device with covers removed.
Figure 10:
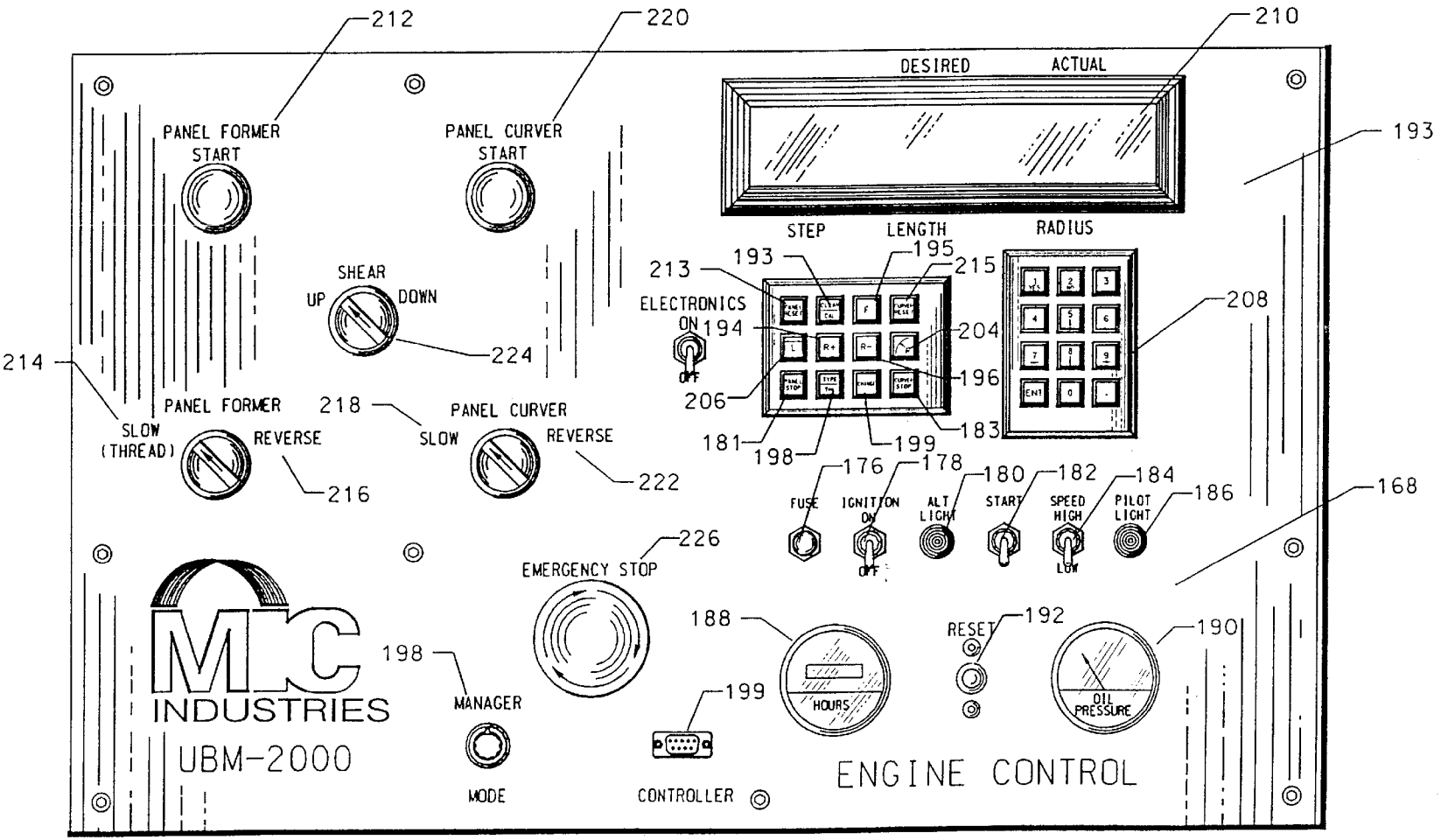
FIG. 10 is an end elevation view illustrating the control panel for control of the machine from one spot by semi-skilled operator.

FIG. 9 illustrates the control panel 48 which also houses the microprocessor. Portion 168 of control panel 48 is for the engine control and includes fuse 176 and ignition switch 178, an alternator indicator 180 and a starter switch 182. The engine motor which is preferably a diesel engine may be controlled at either high or low speeds through control 184 and has a pilot light 186 to indicate the ignition is on. The number of hours the engine has operated is indicated on gauge 188 and the engine oil pressure is indicated on gauge 190. Reset button 192 is utilized to reset the control. In the upper right portion of control panel 48 is the microprocessor control panel 193 which includes an increase radius button 194 and a decrease radius button 196. Building type may be controlled by pushing building type button 198 and entering digits corresponding to the building type, i.e., the shape of the panel to be formed. Conversion of English to metric units is accomplished through the manager mode key switch 198. The thickness may be entered into the microprocessor for controls by pressing the F key 195 and the THK button 198 and the particular thickness on the keypad 208. A display panel 210 is used to display the actual and desired radius and the length. It is also used to display all control and error functions of the microprocessor. For setting a particular length or radius control buttons 204 and 206 are pushed and then the length or radius is set using entry into the microprocessor via the keypad 208.

Control of the panel feed through the panel forming assembly 38 is accomplished by control buttons 212, 214 and 216. Button 214 is the panel feed slow button for initial feeding of the panel into the assembly to be sure everything is correct. The panel former start 214 is used to feed the panel at high speed through the panel former. It shuts off automatically when the desired length is achieved. Panel reverse button 216 is for reversing the forming rolls to feed the panel back out of the former.

The switches on the panel 48 for the curver section 68 have the same functions, namely, feeding the panels slow 218 through the curver, reversing the curver 222 or running it at high speed (normal) 220. The hydraulic shear 40 is operated up and down by a control 224 and the entire machine may be shut down by an emergency stop control 226. A computer RS232 serial port 199 is used to communicate the microprocessor with a personal computer. Switches 213 and 215 are used to reset the panel former and curver respectively. Buttons 181 and 183 are used to temporarily stop the panel former and curver respectively. Button 199 is used to change any function when the machine is running. A clear/calibrate button 193 is used to clear entries and calibrate the machine. The manager mode 198 will allow the operator to check and/or change one hundred different operating parameters of the machine.

Figure 11:
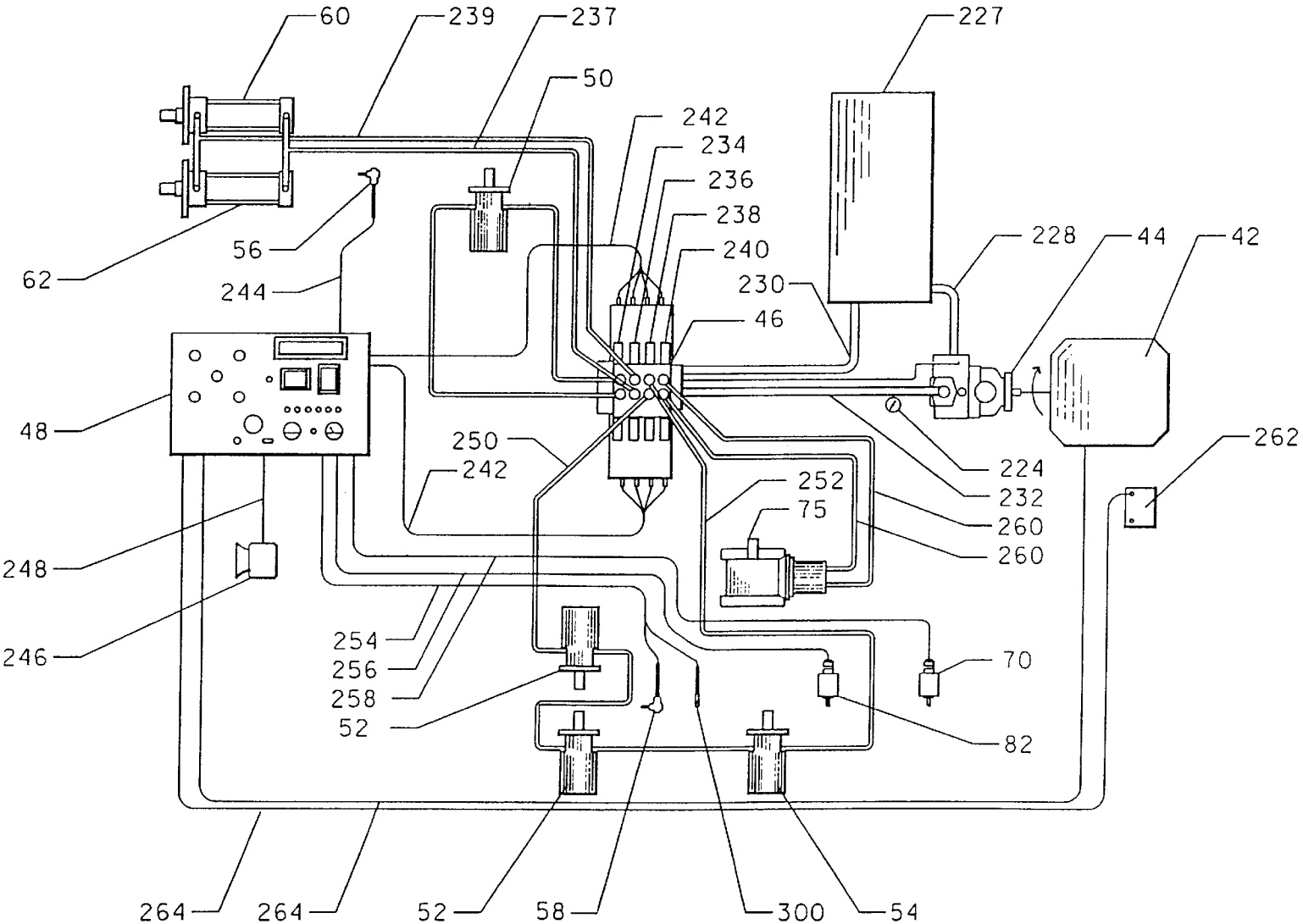
FIG. 11 is a schematic diagram illustrating the connections from the hydraulic and electrical systems for the automatic control of the entire machine.

FIG. 11 is a schematic illustration of the components for controlling the machine. The engine 42 drives the main hydraulic pump 44 which receives hydraulic fluid through line 228 from reservoir 227. Variable volume piston pump 44 pumps hydraulic fluid through line 232 to the main hydraulic valve 46. The pressure is measured and monitored via gauge 224. The main hydraulic valve has four sections 234, 236, 238 and 240. Hydraulic valve section 234 controls the operation of the panel forming drive motor 50 and is controlled by control buttons 212, 214, and 216 on control panel 48 and inputs from the microprocessor. Section 236 of the main hydraulic control valve 46 is for controlling the operation of hydraulic shear 40 by operating the hydraulic cylinders 62 for operating the shear and moving the shear either up or down via hydraulic lines 237 and 239 as shown. Control valve section 238 is for controlling the drive of the crimper roll drive motors 52 and 54. The hydraulic fluid is passed through lines 250 to motors 52 and 54 and back through lines 252. The motors rotate the crimping rolls as previously described. Hydraulic valve section 240 controls the crimping roll positioning motor 75 through hydraulic lines 260 to move the crimping roll 70 toward or away from roll 72 in order to control the degree of curvature from a straight panel to a panel with a desired radius.

An audible alarm 246 is connected via electrical line 248 to the microprocessor and main control panel 48.

The microprocessor controls all four valve sections 234, 236, 238, 240 through signals sent via electrical harness 242.

The panel length measuring device 58 sends signals to the microprocessor through harness 244 and the microprocessor then controls the speed and duration of drive via motor 50 according to that preset for panel length by the control panel.

Similarly, the length measuring device 58 feeds signals through electrical lines 254 to the microprocessor incorporated behind the control panel 48 and signals are fed via line 242 to control valve portion 238 to control the amount and the drive of the motors 52, 52 and 54 and hence the length passing through the crimper rolls. The curvature detected by radius measuring device 74 is fed through harness 258 to the microprocessor and the microprocessor sends back signals to control valve 240 to control crimping roll positioning motor 75 to position the crimping roll and control the radius. The position of the crimping roll 70 is detected by encoder 82 which feeds its signal through line 256 to the microprocessor which in turn sends signals to valve section 240 to accurately determine the position and hence further control motor 75 to position the crimping roll.

Operation of the machine will now be described. The machine starts with a coil of flat steel on roll 36 positioned on trailer 30. Under the control of panel switches 212, 214 and 216 the steel is fed through the panel forming section 38 driven by hydraulic motor 50 to an extent determined by the length entered in via keypad 208 and length button 206 in the control panel. As the panels are formed the sensor 56 electronically measures the panels as they are coming off the roll forming line sending input signals through a line 244 back to a control panel and microprocessor 48. When the desired length is achieved the motor 50 shuts down automatically and the controls signal the operator to shear the panel via shear 40. The operator then operates shear control button 214 to shear the panel and the sheared panel rests on run-out table 64 supplied with the machine. The table 64 will hold the panels until they are ready to be curved through the curving section 68. The machine is capable of producing multiple different panels depending upon the shape of the rolls in section 38. A panel 24 inches wide or 22 inches wide may be formed with a coil 36 inches wide, a panel 12 inches wide or 16 inches wide may be formed from, a 24 inch panel and a 20 inch panel may be formed from a 36 inch wide coil.

The formed panel is then fed back through the curving assembly 68 and the sides are crimped via side crimping roll 76 under the control of motors 52. The operator then enters the desired radius by pushing the radius button 204 and the keypad may be used to set the radius. Encoder 82 will determine the position of the main crimping roll 70 relative to roll 72. The operator then inserts the panel into the curving section and starts the curving process using buttons 218 to start and then switching to button 220. The side crimping motor 52 will drive the panel through the curving section under hydraulic power and the main crimping rolls 70, 72 are also hydraulically operated for rotational drive by motor 54. The encoder 74 will rest on the crimped panel and measure the appropriate radius. If the radius measured does not match as the desired radius entered into the microprocessor the encoder 74 will send the signal back to the main panel through line 258 which will operate valve 240 to cause motor 275 to reposition crimping roll 70. The encoder 82 receives a signal from the microprocessor through line 256 informing the controller that a new radius will be used. This is then stored into the microprocessor for future reference. The crimping roll 70 is adjusted to the desired radius and when this is achieved the microprocessor will alert the operator and the panels continue to be formed, and they rest on layout tables 78.

In order to construct special buildings with a portion of the panel straight and other portions having one or more desired radius of curvature, the operator inputs the information into the control panel microprocessor 48 to send signals to the encoders 74, 58 and 82 to control the curving section. For example, if the operator wants a straight wall, a curved roof and straight wall, the first input from the control panel would be the straight wall length; this could be inputted through the numerical keypads 208. The desired curvature of arch could also be inputted followed by input for the final straight section. Also, certain building types which are recurring are given codes which can be inputted to the microprocessor after pressing the "Type" button 198. The machine can measure through the measuring device 58 the appropriate length of a straight portion of the panel P. At this point only the side flanges are crimped leaving the center bottom untouched so that it is not curved. When the desired length is achieved the microprocessor tells the drive motors to stop. At this point the crimping roll 70 will move in a position via hydraulic motor 75 and its gear reducer. The microprocessor then commands the drive to continue forming the panels in an arch shaped section while carrying the straight wall across the run out table. Once the proper arch length is achieved, the machine stops again so that the main crimping roll can pull away from the panel and allow a third and last section to be formed as a straight section. The microprocessor will control all these functions including proper delay times, proper radius and proper length of the panels. The control panel 48 also includes manual overrides 194 and 195 to allow the operator to make emergency adjustments to radius control. These override switches control valve 240 to feed motor 75.

Building type button 196 can give the operator flexibility when choosing a desired building type inputting a single command via keypad 208. The thickness entry via keys 195 and 198 is primarily for the memory of the microprocessor.

Figure 12:
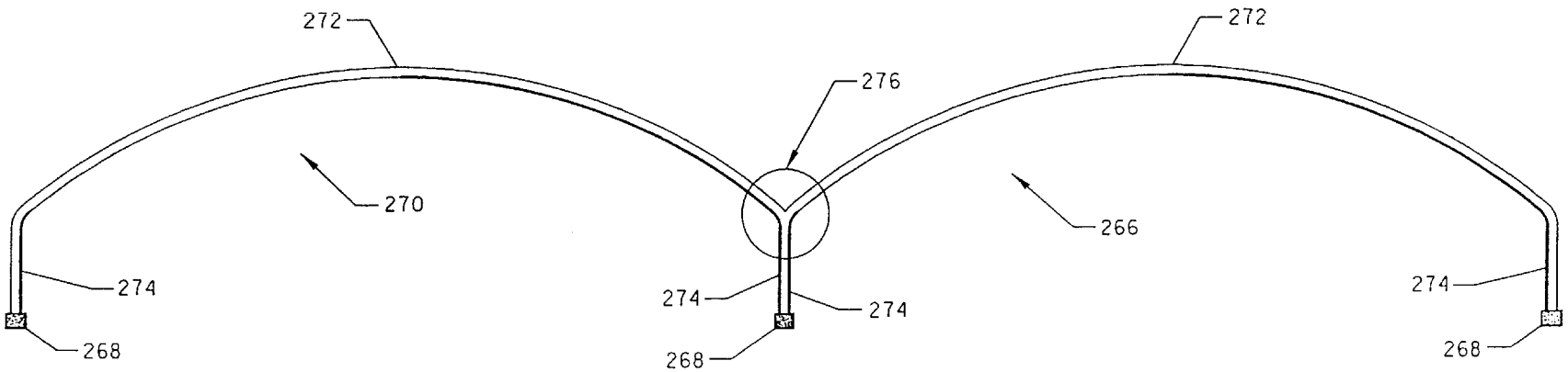
FIG. 12 is a schematic end elevation view of one shape of a building that can be made using this invention.

FIG. 12 shows one type of building 226 that can be built using this invention. A panel span 270 has an arched roof 272 sandwiched between two vertical wall portions 274. In this case the entire building 266 is formed by assembling panel sections side by side as shown in FIG. 12 in which the vertical side walls 274 are back to back and attached together forming a common vertical wall 276. This building can also be used as a single or multiple unit. The assembly may conveniently be erected on footings or foundations 268 as is known in the art.

Figure 13:
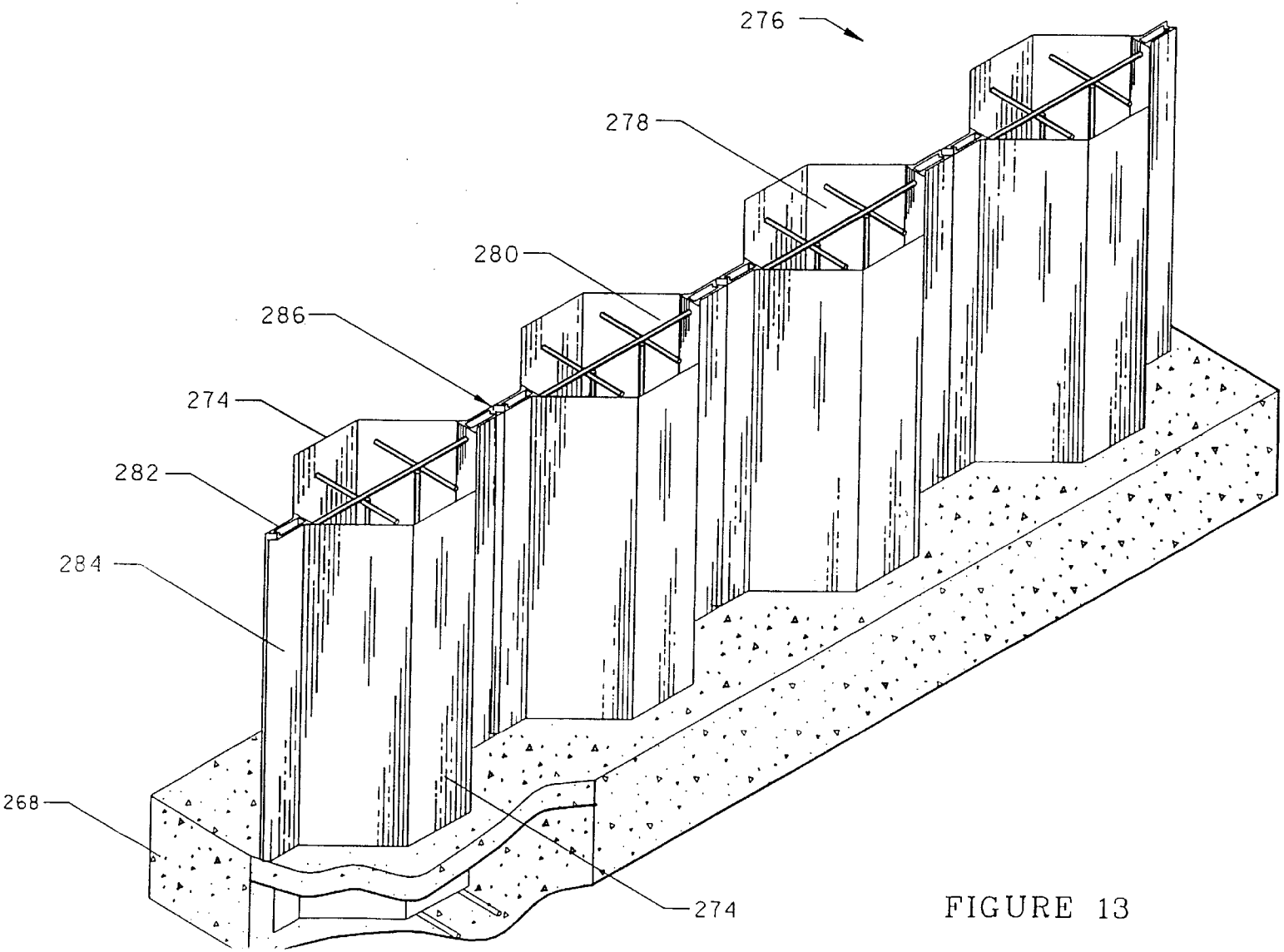
FIG. 13 is a perspective view illustrating a detail of the building of FIG. 12 showing the assembly where the building is assembled, and illustrating the self support.

A detail of the common vertical wall 276 is shown in FIG. 13. The panels when assembled together form a section with cavities of hexagonal or honeycomb shape 278. Reinforcing bar assemblies 280 may be placed in these cavities and the cavities may be filled with concrete (not shown) for rigidity and support. Extruded aluminum panels 282 may be assembled between the panels and attached by fasteners 284 to secure the panels together in a back to back manner. Electrical conduits may be passed through cavities 286 in the extruded members or may be passed through certain of the cavities 278 which then would not be filled with concrete.

Figure 14:
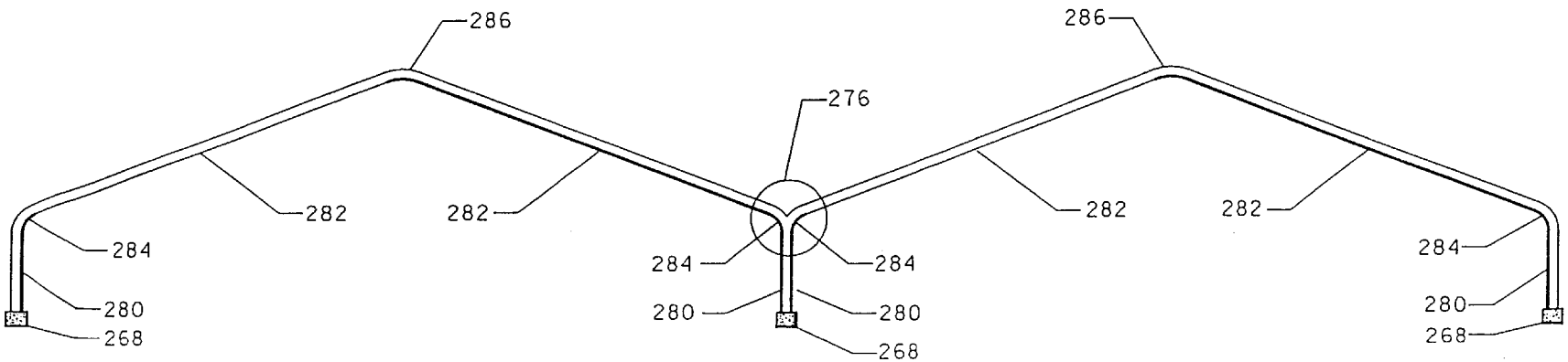
FIG. 14 is a schematic end elevation view of another shape of building which can be made using this invention.

FIG. 14 depicts another form of completed building structure. These buildings are formed using straight vertical walls 280, separated from the sloping straight roof portion 282 by a curved section 284. A small curved section 286 at the apex of the building will complete the shape. Two or more buildings can be constructed by using the vertical column support 276 as previously described. This concrete vertical column can also be used on straight vertical walls in single buildings as well.

As can be seen this invention provides a unique machine for automatically and controllably forming sheet metal into panels for metal buildings together with a unique method for forming desired panels and a new building type. It is the intention therefore to be limited only by the scope of the appended claims.

What is claimed is:

1. A machine for automatically and controllably forming sheet metal into panels for metal buildings having combined walls and roof panels, at least a portion of which are arched or curved; the machine comprising;

a) roll forming means for roll forming sheet metal material into a desired panel profile having a central bottom portion between upturned lateral edge portions;

b) shear means adjacent the roll forming means for shearing the roll formed panel;

c) crimping means for continuously crimping by bending small folds in the bottom portion of formed sheared panel lengths fed through the crimping means to provide a curvature of the formed panels, the depth of the folds establishing the curvature;

d) panel curvature measuring means for measuring the curvature of bottom crimped formed panels; and;

e) automatic digital control means for controlling the crimping means to vary the control the extent of curvature of the formed panels by varying the depth of the folds, the automatic digital control means being at least partially responsive to the measuring means and a control input setting of desired curvature.

2. A machine as defined in claim 1 further comprising; means for automatically and controllably adjusting the crimping means only so that the sheared panel bottom portion is not crimped and a corresponding portion of the formed panel is straight.

3. A machine as defined in claim 2 further comprising; additional crimping means for crimping the edge portions of the formed panels, and length measuring means connected to control means for continuously and automatically measuring the length of formed panels passing through the crimping means.

4. A machine as defined in claim 1 wherein the crimping means includes a pair of crimping rolls sandwiching the bottom of the formed panel, a moveable block mounting at least one crimping roll so that the crimping rolls may be positioned toward or away from each other, means controlling movement of the block responsive to the control means.

5. A machine as defined in claim 4 wherein the bottom crimping rolls are driven by chains.

6. A machine as defined in claim 1 wherein the control means includes a control panel, a microprocessor and hydraulic and electrical circuits.

7. A machine as defined in claim 6 wherein the control panel allows adjustment of the curvature length of curved portion, and length of straight portion of a formed panel.

8. A machine as defined in claim 7 wherein the control panel includes automatic shut down means and a computer connection.

9. A machine as defined in claim 1 wherein the machine is further mounted on a wheel vehicle for mobility.

10. A machine as defined in claim 9 further comprising hydraulic activated shear means mounted on the vehicle for shearing desired length of the formed metal panel.

11. A method of making panels for a self-sustaining building formed of such panels seamed together side by side, the method comprising;

a) roll forming sheet metal from a roll of sheet metal into a desired cross-sectional configuration having side edges and a bottom;

b) shearing the formed configuration at a desired and predetermined length;

c) crimping by placing small indentations to the side edges of the predetermined length of formed configuration to add strength;

d) curving the sheared lengths of roll formed sheet metal by automatically and controllably crimping by placing small indentations to the bottom of the formed configuration to add strength and to provide a predetermined curvature for a portion of the predetermined length to provide a building panel having a curved roof portion and straight vertical wall portions on opposite sides of the roof portion, the depth of the indentations establishing the curvature; and e) measuring the curvature and the predetermined length of the crimped panel and using such measuring and a predetermined setting of curvature for continuously and automatically controlling the depth of the indentations during crimping without removing the panel from the crimping step.

*12. A machine for automatically and controllably forming sheet metal into panels for metal buildings having combined walls and roof panels, at least a portion of which are arched or curved, the machine comprising;*

*a) a plurality of metal forming rolls arranged to form sheet metal material into a desired panel profile having a central bottom portion between upturned lateral edge portions;*

*b) a movable shear blade adjacent said plurality of metal forming rolls, wherein said moveable shear blade cooperates with an other severing implement to cut said panel;*

*c) crimping rollers for continuously crimping by bending small folds in the bottom portion of said cut panel lengths fed through said crimping rollers to provide a curvature to said formed panels, the depth of the folds establishing the curvature;*

*d) a curvature gauge for measuring the curvature of bottom crimped formed panels, and;*

*e) an automatic digital controller to control the crimping rollers to vary the depth of the folds produced by said crimping rollers to control the extent of curvature of the formed panels, the automatic digital controller being at least partially responsive to said curvature gauge and a control input setting of desired curvature.*

*13. A machine as defined in claim 12 further comprising said digital controller automatically and controllably adjusts the crimping rollers so that a portion of the formed panel is straight.*

*14. A machine as defined in claim 12 further comprising:*

*additional crimping rollers for crimping the edge portions of the formed panels, and length measurement devices connected to said digital controller for continuously and automatically measuring the length of the formed panels passing through the crimping rollers.*

*15. A machine as defined in claim 12 wherein the crimping rollers include a pair of crimping rollers sandwiching the bottom of the formed panel, a moveable block mounting at least one crimping roller so that the crimping rollers may be positioned toward or away from each other, and a motor to control movement of the block in response to said digital controller.*

*16. A machine as defined in claim 15 wherein the bottom crimping rollers are driven by chains.*

*17. A machine as defined in claim 12 wherein the digital controller includes a control panel, a microprocessor and hydraulic and electrical circuits.*

*18. A machine as defined in claim 17 wherein the control panel allows adjustment of the curvature length of curved portion, and length of straight portion of a formed panel.*

*19. A machine as defined in claim 18 wherein the control panel includes automatic shut down means and a computer connection.*

*20. A machine as defined in claim 12 wherein the machine is further mounted on a wheeled vehicle for mobility.*

*21. A machine as defined in claim 20 further comprising hydraulic activated shear blades mounted on the vehicle for cutting a desired length of the formed metal panel.*

*22. A method of making panels for a self-sustaining building formed of such panels seemed together side by side, as in claim 11, wherein said side edge crimping is performed by at least two crimping rollers sandwiching at least one edge portion of said formed panels.*

*23. A method for making panels, as in claim 11, wherein said depth of the crimping indentations is controlled by a digital controller.*

*24. A method of making panels, as in claim 11, wherein said panels are formed by a machine mounted on a wheeled vehicle for mobility.*

*25. A method for making panels, as in claim 23, wherein the depth of said bottom crimping indentations is controlled independently of the depth of said edge crimping indentations.*

*26. A method for making panels, as in claim 11, wherein said bottom crimping indentations in a single formed panel have a plurality of depths.*

*27. A method for making panels, as in claim 11, wherein said roll forming, crimping and curving steps are performed on a machine mounted to a wheeled vehicle.*

*28. A machine as defined in claim 12, wherein said curvature gauge measures the radius of said panel.*

* * * * *